United States Patent [19]

Giulie et al.

[11] E Patent Number: Re. 31,729

[45] Reissued Date of Patent: Nov. 13, 1984

[54] POWER ACTUATED LAMINATING MACHINE

[75] Inventors: Joe D. Giulie; Leslie E. Worcester, both of Palo Alto, Calif.

[73] Assignee: General Binding Corporation, Northbrook, Ill.

[21] Appl. No.: 965,097

[22] Filed: Nov. 30, 1978

Related U.S. Patent Documents

Reissue of:

[64] Patent No.: 4,097,326
Issued: Jun. 27, 1978
Appl. No.: 784,680
Filed: Apr. 5, 1977

[51] Int. Cl.[3] ..... B30B 15/34

[52] U.S. Cl. ..... 156/366; 100/51; 100/93 P; 100/93 RP; 100/218; 156/583.1

[58] Field of Search ..... 156/366, 368, 499, 555, 156/582, 583.1, 583.9; 100/51, 93 P, 93 RP, 210, 218

[56] References Cited

U.S. PATENT DOCUMENTS

| | | | |
|---|---|---|---|
| 3,047,051 | 7/1962 | Matveeff | 100/93 P |
| 3,139,816 | 7/1964 | Jemison et al. | 100/51 |
| 3,163,104 | 12/1964 | Lapham | 100/93 RP |
| 3,450,031 | 6/1969 | Peterson | 100/93 P |
| 3,598,684 | 8/1971 | Militana et al. | 100/51 X |
| 3,711,355 | 1/1973 | Staats et al. | 156/555 X |
| 3,770,550 | 11/1973 | Levitan | 156/555 X |
| 3,840,420 | 10/1974 | Sarcia | 156/358 |
| 3,943,031 | 3/1976 | Krueger et al. | 156/583.1 |
| 4,021,288 | 5/1977 | Hannon et al. | 156/555 X |

*Primary Examiner*—Michael G. Wityshyn
*Attorney, Agent, or Firm*—Hill, Van Santen, Steadman & Simpson

[57] ABSTRACT

An automatic laminating machine is provided for use with pre-fabricated laminating packets having a tear-off tab with a plurality of notches thereon. The machine is substantially automatic in its operation and can be easily operated by an inexperienced operator. The machine requires no warm-up time and heats up in only 10 seconds each time a packet is inserted. The machine will not operate unless it is used with a laminating packet with a pull tab of proper configuration which not only energizes the machine but also aligns the packet within the machine.

7 Claims, 8 Drawing Figures

POWER ACTUATED LAMINATING MACHINE

Matter enclosed in heavy brackets [ ] appears in the original patent but forms no part of this reissue specification; matter printed in italics indicates the additions made by reissue.

SUMMARY OF THE INVENTION

Various laminating machines have been proposed in the past but they have not been fully satisfactory. Most of them have been relatively bulky and expensive and required a substantial amount of skill to operate. They also require a warm-up time of from 5 to 15 minutes even if just one sheet is to be laminated.

In addition, such machines are not adapted to work with laminating packets wherein a packet has a tear-off tab thereon with notches. Machines do exist which use a packet without a tab, but the packet must be inserted into a carrier consisting of a silicon coated cardboard folder in order to be inserted into the machine. Not only is the carrier expensive and awkward to use, but the heating time is lengthened because the unit must heat through the cardborad folder in order to heat the packet. Further after the laminating process, the finished laminated packet must be left in the carrier to cool for 30 seconds as the carrier retains the heat. If opened too soon the soft packet will be damaged. The machine of the present invention will not be actuated in the absence of a packet having the desired characteristics nor can the machine be actuated without inserting a packet into the machine.

The machine of the present invention requires no warm-up, requires no carrier and no cooling period after laminating due to trapped heat.

Various other features and advantages of the device of the present invention will be brought out in the balance of the specification.

DESCRIPTION OF THE PREFERRED EMBODIMENTS

Figure 1:
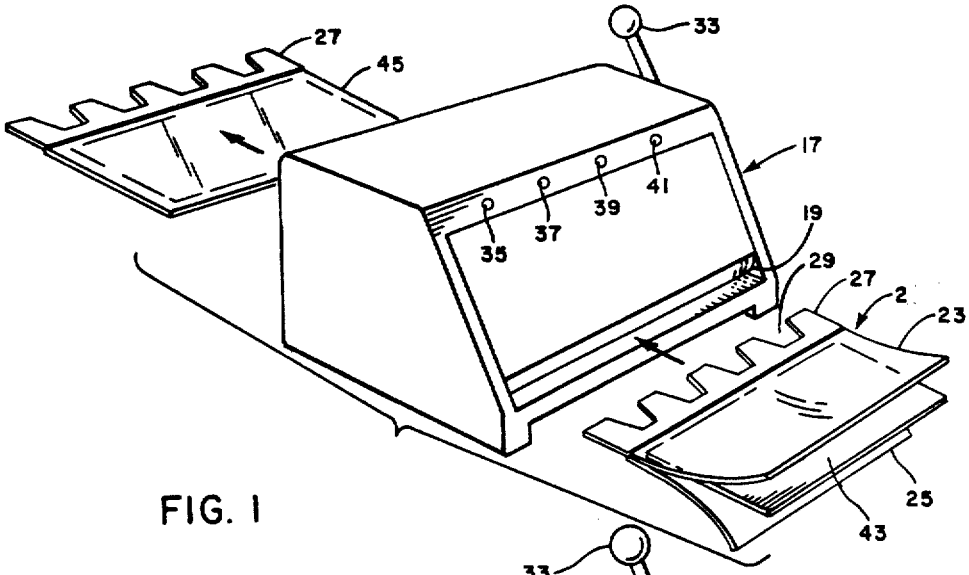
FIG. 1 is a perspective view of a machine embodying the present invention.

Referring now to the drawings by reference characters, the machine of the present invention is generally designated 17 and has a slot 19 for the insertion of the material to be laminated. The material to be laminated consists of a packet generally designated 21 and consists of an upper sheet 23 and a lower sheet 25 of a heat sealing plastic and has a removable tab 27 at one end thereof. Each of the plastic sheets typically consists of a Mylar sheet of plastic coated with polyethylene on the inside surface facing the other sheet. The tab has a plurality of slots 29, for purpose of which will be later explained. The device has an operating handle 33 which serves to actuate the machine as is later explained in detail. Indicator lights 35, 37, 39 and 41 are on the top of the machine and the purpose of these indicator lights will be later explained. Some or all of these lights may be eliminated since they are not essential to the functioning of the machine.

Figure 5:
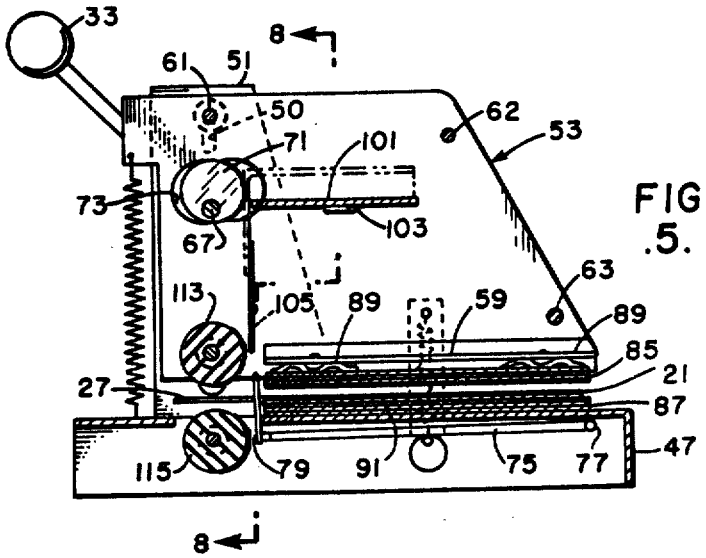
FIG. 5 is a section on the line 5—5 of FIG. 3. The parts are shown with a laminating packet in place, but before the starting handle has been actuated.

In order to laminate a flat article, the article 43 is placed in the packet 21 between the sheets 23 and 25, and the packet inserted through the slot 19. The packet is pushed to the rear of the machine until the fingers (later described) engage the bases of the slots 29 which serves to locate the packet accurately. As can be seen in FIG. 5, the plastic portion is between the platens while the tab extends under the rollers. Handle 33 is then brought forward, starting the laminating operation as is hereinafter explained in detail. After a suitable dwell, the finished laminated article 45 is then discharged from the rear of the machine. At this point, tab 27 can be torn off to complete the laminating operation and the machine is ready for a repetition of the operation.

The machine of the present invention is built upon a generally rectangular base 47 having fixed uprights 49 and 51 on either side thereof toward the rear. These uprights serve to support a floating subassembly or carriage generally designated 53 having side plates 55 and 57 which have brackets 59 along their bottom edges and which are held in spaced relationship by the rods 61, 62 and 63. The rod 61 fits in the slot 65 in the end plate 49 and also a corresponding slot 50 in the end plate 51. Thus, the assembly can move up and down through a limited range with respect to base 47.

Shaft 67 is mounted for rotation in the uprights 49 and 51 and carries the eccentrics 69 and 71 as well as handle 33. These eccentrics move in horizontal slots 73 and 75A in the two end plates.

Figure 2:
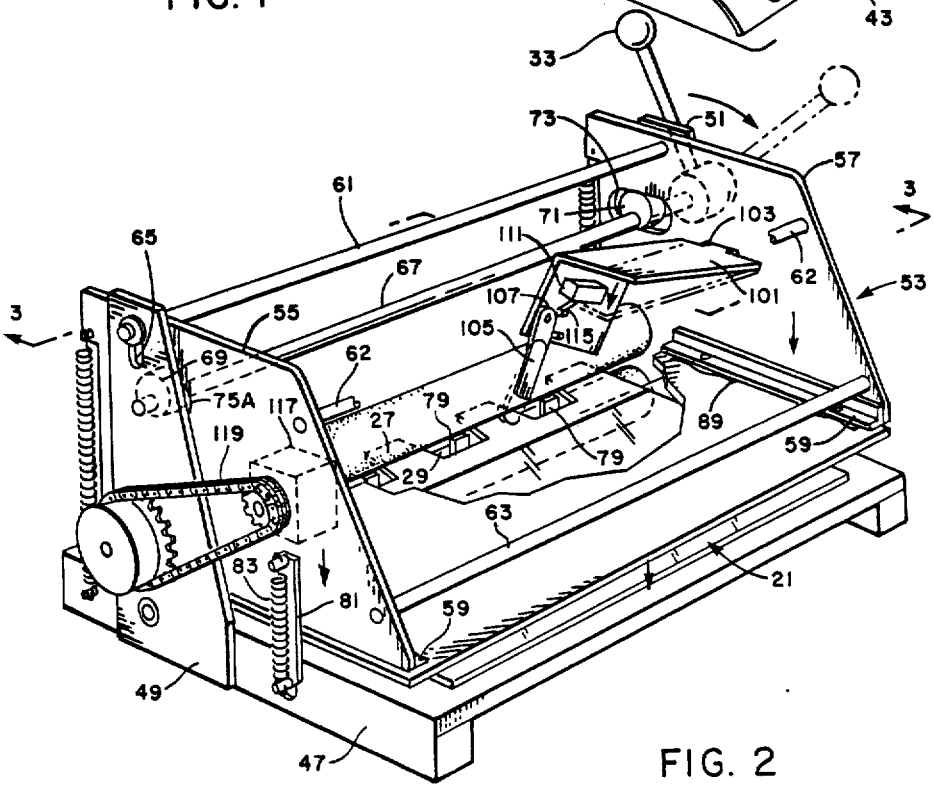
FIG. 2 is an enlarged perspective view of the machine with the cover removed with some of the parts in section.
Figure 4:
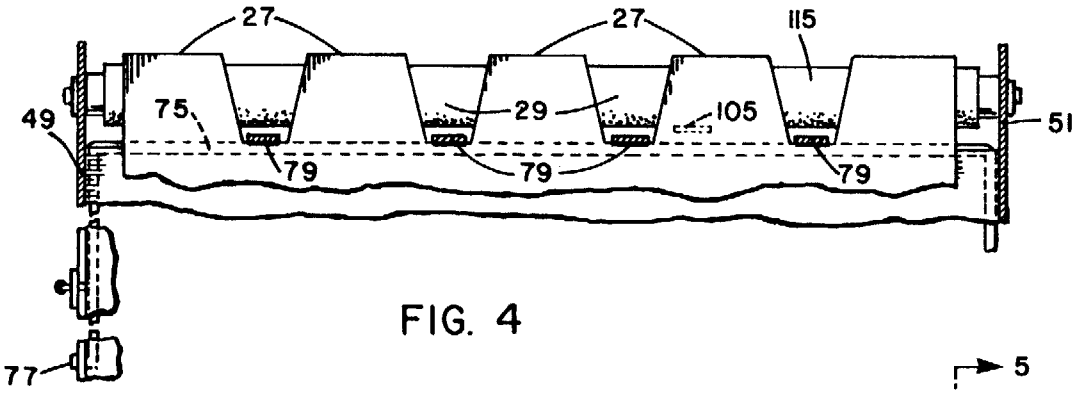
FIG. 4 is a section on the line 4—4 of FIG. 3.
Figure 6:
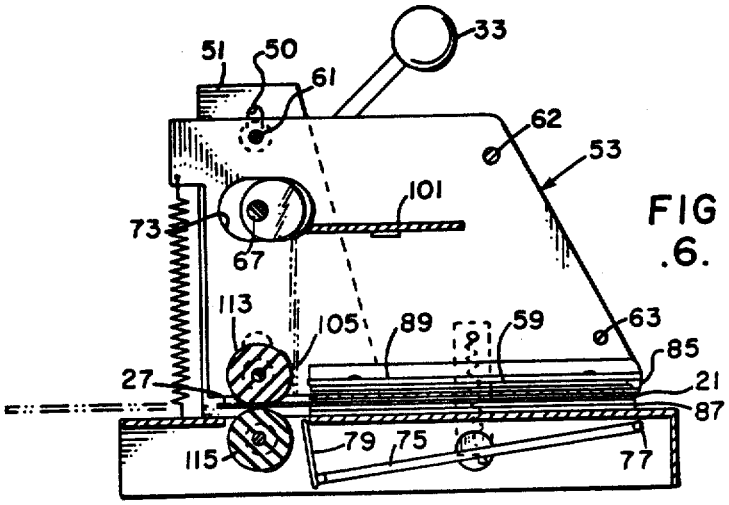
FIG. 6 is a view similar to FIG. 5 showing the position of the parts when a lamination operation is taking place.

Thus, by moving the handle 33 from the position shown in solid lines in FIG. 2 to the position shown in dot-dash lines, the assembly 53 will move from the raised position shown in FIGS. 2 and 5 to the lower position shown in FIG. 6.

Mounted on the base 47 are rods 75 pivoted at 77 with fingers 79 which normally extend above the base member 59 at the rear thereof as is best seen in FIGS. 2 and 5. Four fingers 79 are illustrated, corresponding with the four slots 29 in the lamination packet 21 but it will be understood, of course, that the machine might be designed with more or fewer fingers. The rods 75 lie under member 81 which is rigidly mounted on the side plate 55 and are biased upwardly by the spring 83 against the end of member 81. Thus, when the assembly 53 is lowered, the fingers 79 will be lowered as is best seen in FIG. 6.

Figure 7:
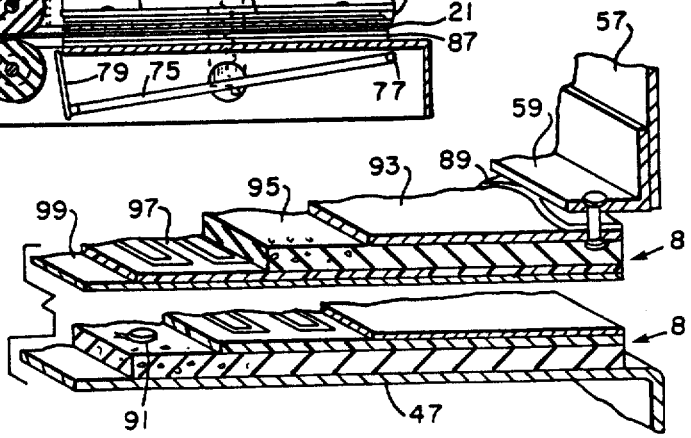
FIG. 7 is an enlarged partial view in section showing the laminating platens.
Figure 8:
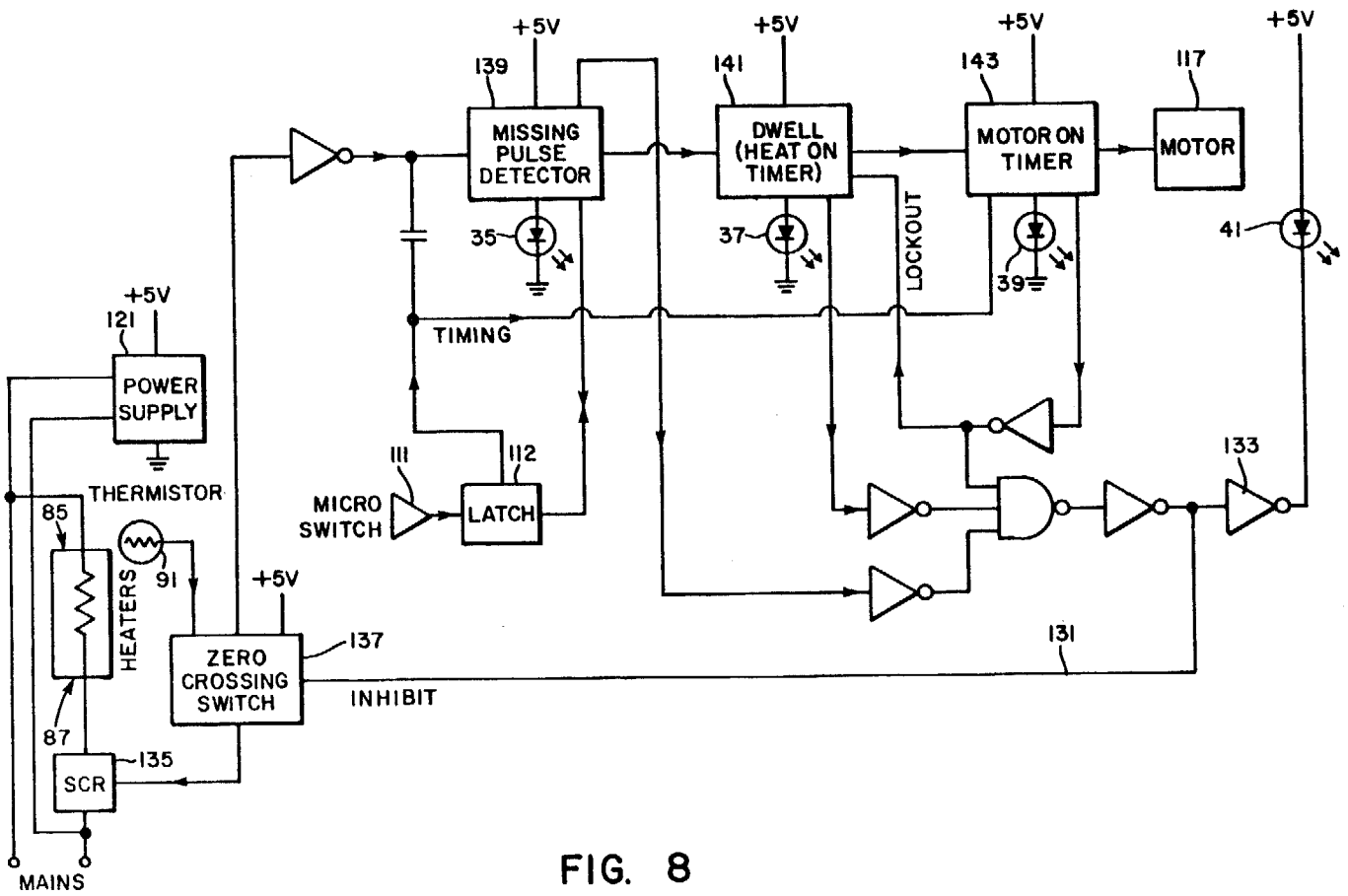
FIG. 8 is a block diagram of the control circuit.

Mounted under the angle brackets 59 of subassembly 53 is the upper heating element 85 while a corresponding lower heating element 87 is mounted on the base 47. The upper heating element 85 is mounted on springs 89 to secure pressure over the area of the element. The lower element 87 incorporates a thermister 91 for temperature control. The internal structure of the heater elements is shown in FIG. 7 and consists of a backing plate 93 of stiff metal, a pad of foam silicon rubber 95, a printed circuit heater element 97 and a thin flexible metallic sheet 99 coated with a non-stick fluorocarbon resin such as Teflon; this sheet acts to distribute the heat, protect the heater and allow a low friction surface for the packet to slide upon. The lower element 87 is of substantially the same structure except that it incorporates the thermister 91 for temperature control purposes.

An angle plate 101 is pivoted in slot 103 in wall 57 and is biased downwardly by spring 104. This plate carries a pivoted feeler 105 which normally falls between the fingers 79 if there is no laminating packet in the machine and which will contact one of the tabs 27 if a laminating packet is in the machine. The top of feeler 105 is formed with a cam surface 107. A microswitch 111 is also mounted on plate 101. The microswitch 111 has an arm 115 adjacent the cam surface 107 and actuates the switch when feeler 105 rotates in a clockwise direction when the feeler contacts tab 27 as is best seen in FIG. 3.

Figure 3:
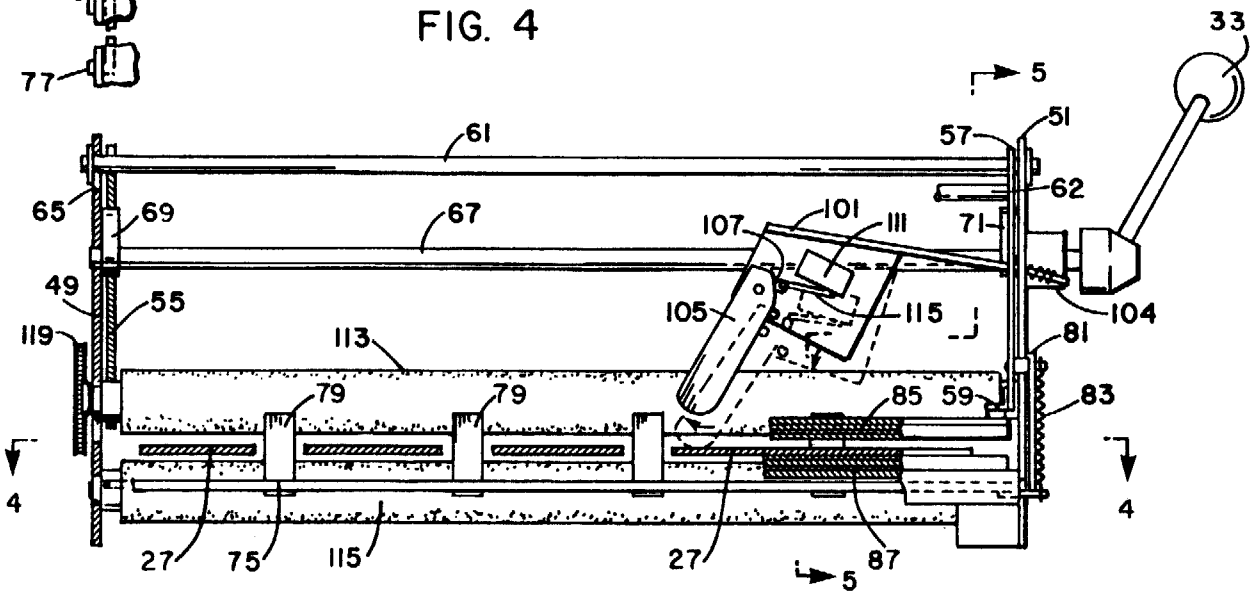
FIG. 3 is a section on the line 3—3 of FIG. 2.

The action of these parts can best be seen in FIGS. 2 and 3. The position of the parts is shown with a packet inserted in the machine with the tabs 27 falling between the fingers 79. As handle 33 is brought forward, the fingers 79 are lowered and the arm 101 moves down and the feeler 105 is stopped by tab 27 and caused to rotate as is shown by the arrow in FIG. 3; this causes cam surface 107 to move arm 115 of microswitch 111, initiating the laminating action. When the packet is pulled out of the machine, as is later explained in detail, gravity will cause feeler 105 to rotate counterclockwise, opening switch 111. If one brings the arm down when there is no packet in the machine or a packet or other sheet not having the tabs which will extend beyond the fingers 79, the feeler will not rotate so the machine will not start.

Near the rear of the machine are located the pressure rollers 113 and 115. Rollers 113 is mounted for rotation on the assembly 53 while roller 115 is mounted for rotation on the frame 47. Roller 113 is driven by motor 117 through a chain 119.

FIG. 14 is a block diagram of a suitable electronic circuitry for operating the machine. When the machine is plugged in, line 131 is low so that inverter 133 causes LED 41 to glow indicating that the machine is ready for operation. One places a packet 21 in the machine pushing it back until the fingers 79 engage the packet in the notches 29.

The machine is not equipped with an on-off switch and when it is first plugged in, LED 41 will glow, showing that the machine is ready for operation. One now brings the handle 33 down, closing microswitch 111 which will activate the zero crossing switch 137 through latch 112 turning on heaters 85 and 87 through SCR 135 and turn on light 35. As the heaters come up to the proper operating temperature, thermister 91 acting through zero crossing switch 137 will cause the heaters to turn off and on to maintain the desired temperature. At the first turn off the missing pulse detector 139 will detect this and will initiate action of the dwell timer 141 and turn on LED 37, showing the operator that the heating portion of the lamination operation has commenced. At the end of the dwell, timer 141 will send a pulse to timer 143 which will turn on light 39 and start motor 117. This will draw the packet between the rollers, completing the lamination operation. As the trailing edge of the packet passes feeler 105, it will drop down, opening microswitch 111. However, a time delay is built into timer 143 so that motor 117 will continue to operate for a sufficient length of time for the packet to completely clear the machine. At this time, the lamination operation is substantially complete and it is only necessary to tear off the tab to complete the lamination operation. As the motor goes off, the machine will go back into a standby and light 41 will come on, showing the operator that the machine is in position for a repetition of the cycle.

The electronic control equipment described is not essential for the operation of the laminator except for the temperature control. The various operations can be controlled manually.

We claim:

1. A laminating machine for use with pre-fabricated laminating packets wherein said packets have a pair of heat sealable sheets connected together at one edge with a tear-off tab at the point of connection, said tear-off tab having a generally straight end with a plurality of notches in said end, comprising in combination:

a. upper and lower flat heating elements;

b. upper and lower rollers adjacent the exit end of said heating elements and spaced therefrom;

c. stop fingers located between said heating element and said rollers, said fingers being adapted to engage the tab between the notches whereby portions of said tear off tab on said packet extend beyond said fingers and between said rollers;

d. means for bringing said heating elements and said rollers together to engage the heat sealable portion of a laminating packet between the heating elements and the tab between said rollers and simultaneously move said fingers out of contact with said packet;

e. means for maintaining said packet between said heating elements for time sufficient to soften the laminating sheets; and f. motor means for rotating said rollers to pull said packet between said rollers to complete the laminating operation.

2. The laminating machine of claim 1 wherein the heating elements each include a printed circuit heater adjacent a flat metal plate.

3. The structure of claim 2 wherein each said flat metal plate is provided with a non-stick coating of a flurocarbon resin.

4. The laminating machine of claim 1 having a base with said lower heating element and said lower roller mounted thereon and having a carriage mounted for limited up and down movement over said base with said upper heating element and said upper roller mounted on said carriage and means for moving said carriage toward and away from said base.

5. The laminating machine of claim 1 having detecting means, said detecting means preventing operation of said heating elements in the absence of a packet having tabs in said machine.

6. The laminating machine of claim 5 wherein the detecting means includes a feeler to detect the presence of a tab between said fingers.

*7. A laminating machine for use with pre-fabricated laminating packets wherein said packets have a pair of heat sealable sheets connected together at one edge with a tear-off tab at the point of connection, said tear-off tab having a generally straight end, comprising in combination:*

*a. upper and lower flat heating elements;*

*b. upper and lower rollers adjacent the exit end of said heating elements and spaced therefrom;*

*c. stop means engaging the tab such that portions of said tear off tab on said packet extend between said rollers and the heat sealable portion of the laminating packet is positioned between the heating elements;*

*d. means for engaging the tab between said rollers;*

*e. means for maintaining said packet between said heating elements for time sufficient to soften the laminating sheets; and*

*f. motor means for rotating said rollers after the laminating sheets are softened to pull said packet between said rollers to complete the laminating operation.*

* * * * *